No. 777,409. PATENTED DEC. 13, 1904.
F. A. FORSBECK.
SAFETY PIN.
APPLICATION FILED DEC. 15, 1902.
NO MODEL.
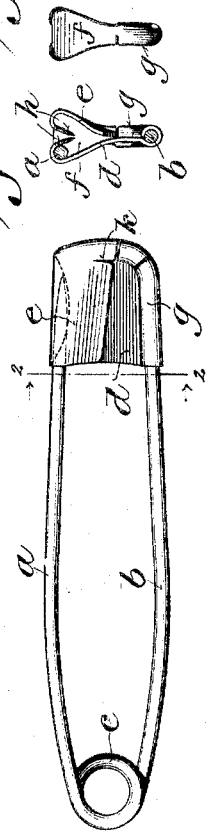
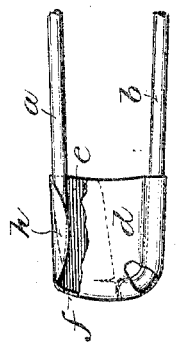
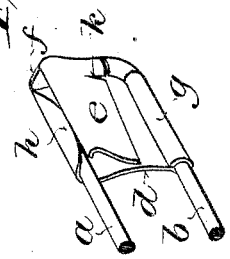
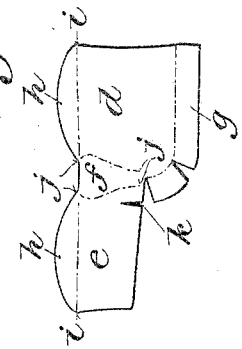
Witnesses:
Geo. W. Young
Chas. L. Goss.
Inventor:
Filip A. Forsbeck,
By Winkler Flanders Smith Bottom & Vilas
Attorneys.

No. 777,409. Patented December 13, 1904.

UNITED STATES PATENT OFFICE.

FILIP A. FORSBECK, OF MILWAUKEE, WISCONSIN.

SAFETY-PIN.

SPECIFICATION forming part of Letters Patent No. 777,409, dated December 13, 1904.

Application filed December 15, 1902. Serial No. 135,222. (No model.)

*To all whom it may concern:*

Be it known that I, FILIP A. FORSBECK, a citizen of the United States, residing at Milwaukee, in the county of Milwaukee and State of Wisconsin, have invented certain new and useful Improvements in Safety-Pins, of which the following is a specification, reference being had to the accompanying drawings, forming a part thereof.

The main object of this invention is to facilitate engaging the point of the pin with the guard, or locking the pin, and disengaging the point from the guard, or unlocking the pin.

It consists in certain novel features of construction and in the arrangement and combinations of parts hereinafter particularly described, and pointed out in the claims.

In the accompanying drawings like letters designate the same parts in the several figures.

Figure 1 is a side view of a safety-pin embodying the aforesaid invention. Fig. 2 is a cross-section on the line 2 2, Fig. 1. Fig. 3 is an end view of the pin as seen from the right with reference to Fig. 1. Fig. 4 is a reverse side view of the guard end of the pin. Fig. 5 is a perspective view of the guard, and Fig. 6 is a view showing a suitable form of sheet-metal blank for the guard.

While my improved safety-pin is suitable for all the various uses to which safety-pins may be applied, it is of special advantage and convenience for fastening bandages in surgical cases, since it can be easily and quickly closed and opened with the thumb and finger of one hand.

Referring to the drawings, the pin or point member $a$ and the body or bar member $b$ of the pin may be conveniently made in the usual way from a single piece of suitable spring-wire bent to form a loop or coil $c$ or any suitable form of spring connection between the two members at one end of the pin. The free end of the body or bar member $b$ is preferably bent toward the point of the pin for the attachment of the guard.

The blank for the guard, which is made of spring sheet metal, may be cut or stamped in substantially the form shown in Fig. 6. It is composed of two main wings or parts $d$ and $e$, joined together at the ends by an intermediate part $f$, which constitutes the outer closed end of the guard, and the wings $d$ and $e$ being free at their opposite ends are thus yieldingly held together. The wing or part $e$ is cut away on one side, so that it is narrower than the wing $d$, which on the corresponding side has an extension $g$ to be folded around the free end of the body member $b$, as shown in Fig. 5, thereby permanently securing the guard to said member. If necessary or desirable, the extension $g$ may be slit transversely, as shown, to facilitate folding it over the curved portion of the member $b$. On their opposite sides the two wings or parts $d$ and $e$ are formed with corresponding lips $h$, which preferably have curved margins of approximately the form shown. These lips are bent over in the same direction approximately on the lines $i$ $i$, Fig. 6, to form two corresponding inturned hooks or pockets on that side of the guard nearest the pin member $a$ when the wings $d$ and $e$ are folded together approximately on the transverse lines $j$ $j$ shown on Fig. 6. The wing $e$ is bent lengthwise from its hook, lip, or pocket $h$ toward the opposing face of the wing $d$, so that its edge opposite said lip or pocket normally meets or lies close to the wing $d$, as shown in Figs. 2 and 5. To permit bending the inner edge of the wing $e$ at its outer end against or close to the wing $d$ and to allow it to yield more freely away from the opposing face of said wing $d$, a transverse slit $k$ may be made.

The inturned lips or hooks $h$ normally come together or close to each other and form a converging opening through which the point of the pin is guided into the shield. The receptacle formed by the shield for the point of the pin is approximately heart-shaped in cross-section, as shown in Figs. 2 and 5, and the opposing faces of the wings $d$ and $e$ converging toward both the longitudinal slits between them and toward the body member $b$ the point of the pin member $a$ when pressed toward the body member $b$ is first guided into the shield through the outer slit, and if then released it will be caught and held in one of the hooked lips or pockets $h$. By pressing it farther toward the body member *b* the point will pass out of the shield through the inner slit, the wing *e* springing away from the wing *d* sufficiently to permit its passage and then springing back, and thereby preventing the point of the pin when released from reëntering the shield in the opposite direction.

It will be observed that both in closing and opening the pin the point is pressed toward the body member and that it cannot pass in the opposite direction through either of the longitudinal slits or openings between the two wings *d* and *e*.

I do not wish to be understood as limiting myself to the precise details of construction, particularly with reference to the shield herein shown and described, as they may be varied without materially affecting the operation of the pin within the spirit and intended scope of the invention.

I claim—

1. A safety-pin consisting of pin and body members having a spring connection at one end tending to separate the point from the body member, and a shield composed of two connected parts yieldingly connected together and shaped to form a receptacle for the point of the pin member and comprising walls one converging toward the other and the body member and forming passages terminating in longitudinal slits or openings through both of which the point of the pin can be pressed toward the body member either into or out of the receptacle in respectively fastening and unfastening the pin but not in the opposite direction through said slits or openings, substantially as described.

2. A safety-pin consisting of pin and body members connected at one end, and a shield attached to the opposite end of the body member and composed of two connected parts yieldingly held together and forming a receptacle for the point of the pin, with walls converging toward the bar member and separated by expansible longitudinal slits or openings, which permit the point of the pin to be pressed toward the body member either into or out of the shield in respectively fastening and unfastening the pin and prevent movement in the opposite direction, substantially as described.

3. A safety-pin consisting of pin and body members having at one end a spring connection with each other which tends to carry the point away from the body member and a shield composed of wider and narrower parts or wings which are connected with each other at the outer end so as to be yieldingly held together, and are bent lengthwise of the pin toward each other and toward the body member, converging toward their edges which normally lie close to each other on the side of the shield next to the pin member, the opposite longitudinal edge of the narrower wing normally approaching close to the opposing face of the wider wing which is attached to the bar member, substantially as described.

4. A safety-pin comprising pin and body members having a spring connection at one end tending to separate them at the opposite end and a shield composed of two wings connected with each other at their outer ends, one wing being wider than the other and attached to the free end of the bar member, the opposite edges of the two wings being bent inwardly toward each other and toward the body member and forming two hooks or pockets with an inwardly-converging opening between them for the entrance of the point of the pin, and the narrower wing gradually approaching the other wing toward the body member and forming with said wider wing a contracted opening or expansible slit for the exit of the point of the pin from the shield, substantially as described.

5. A safety-pin comprising pin and body members having a spring connection with each other at one end, and a spring-metal shield composed of narrower and wider wings bent longitudinally and folded transversely upon each other into a receptacle for the point of the pin, approximately heart-shaped in cross-section, with expansible longitudinal slits between the two wings for the entrance and exit of the pin-point when pressed toward the body member into and out of said receptacle, substantially as described.

In witness whereof I hereto affix my signature in presence of two witnesses.

FILIP A. FORSBECK.

Witnesses:
  CHAS. L. GOSS,
  BERNARD FAHEY.